(12) United States Patent
Plastina et al.

(10) Patent No.: US 7,792,756 B2
(45) Date of Patent: Sep. 7, 2010

(54) SUBSCRIPTION MANAGEMENT IN A MEDIA SHARING SERVICE

(75) Inventors: Daniel Plastina, Sammamish, WA (US); David Jones, Seattle, WA (US); Ryan Alexander Haveson, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 373 days.

(21) Appl. No.: 11/549,480

(22) Filed: Oct. 13, 2006

(65) Prior Publication Data

US 2007/0299681 A1    Dec. 27, 2007

Related U.S. Application Data

(63) Continuation-in-part of application No. 11/475,314, filed on Jun. 27, 2006.

(51) Int. Cl.
*G06F 21/00* (2006.01)

(52) U.S. Cl. .............................. 705/51; 705/59; 726/3; 726/27; 726/32; 726/33; 707/621; 707/622; 707/630; 707/631; 707/632; 709/216; 709/231

(58) Field of Classification Search ............. 705/51–53, 705/59, 61; 713/160–181; 726/26–33; 380/201, 380/231–233, 259–262, 277; 709/223–237
See application file for complete search history.

(56) References Cited

U.S. PATENT DOCUMENTS

| | | | |
|---|---|---|---|
| 5,355,302 A | | 10/1994 | Martin et al. |
| 5,638,443 A | * | 6/1997 | Stefik et al. ................... 705/54 |
| 5,715,403 A | * | 2/1998 | Stefik .......................... 705/44 |
| 5,774,170 A | | 6/1998 | Hite et al. |
| 5,838,314 A | | 11/1998 | Neel et al. |
| 6,119,098 A | | 9/2000 | Guyot et al. |
| 6,353,398 B1 | | 3/2002 | Amin et al. |
| 6,463,468 B1 | | 10/2002 | Buch et al. |
| 6,662,231 B1 | | 12/2003 | Drosset et al. |
| 6,672,506 B2 | | 1/2004 | Swartz et al. |
| 6,741,188 B1 | | 5/2004 | Miller et al. |
| D494,584 S | | 8/2004 | Schlieffers et al. |
| 6,796,505 B2 | | 9/2004 | Pellaumail et al. |
| 6,837,436 B2 | | 1/2005 | Swartz et al. |
| 6,892,230 B1 | * | 5/2005 | Gu et al. ..................... 709/220 |
| 6,993,553 B2 | | 1/2006 | Kaneko et al. |
| 6,996,537 B2 | | 2/2006 | Minear et al. |
| 7,010,501 B1 | | 3/2006 | Roslak et al. |

(Continued)

OTHER PUBLICATIONS

Web Services Dynamic Discovery (WS-Discovery), Microsoft Corp., Inc., Apr. 2005.*

(Continued)

*Primary Examiner*—Evens J Augustin
*Assistant Examiner*—Calvin K Cheung
(74) *Attorney, Agent, or Firm*—Senniger Powers LLP

(57) ABSTRACT

Providing subscription management in local communication regions. Upon detecting a computing device of a user within a predefined proximity, a media server provides the user with access to a corresponding user profile maintained by a media service. The user profile includes subscription information defining access by the user to media content items available from the media service. The user creates or renews a subscription to the media service while connected to the media server, and subsequently receives media content items from the media service.

14 Claims, 9 Drawing Sheets

U.S. PATENT DOCUMENTS

| | | | |
|---|---|---|---|
| 7,040,541 B2 | 5/2006 | Swartz et al. | |
| 7,063,263 B2 | 6/2006 | Swartz et al. | |
| 7,093,296 B2 | 8/2006 | Nusser et al. | |
| 7,116,661 B2 * | 10/2006 | Patton | 370/390 |
| 7,171,378 B2 | 1/2007 | Petrovich et al. | |
| 7,195,157 B2 | 3/2007 | Swartz et al. | |
| 7,233,990 B1 * | 6/2007 | Debaty et al. | 709/224 |
| 7,251,617 B1 * | 7/2007 | Walker et al. | 705/16 |
| 7,363,278 B2 | 4/2008 | Schmelzer et al. | |
| 7,376,581 B2 | 5/2008 | DeRose et al. | |
| 7,383,229 B2 | 6/2008 | Jacoby | |
| 7,385,501 B2 | 6/2008 | Miller et al. | |
| 7,525,450 B2 | 4/2009 | Miller et al. | |
| 7,644,174 B2 | 1/2010 | Ryu et al. | |
| 2001/0030664 A1 | 10/2001 | Shulman et al. | |
| 2001/0042249 A1 | 11/2001 | Knepper et al. | |
| 2002/0010759 A1 * | 1/2002 | Hitson et al. | 709/219 |
| 2002/0029169 A1 | 3/2002 | Oki et al. | |
| 2002/0040326 A1 | 4/2002 | Spratt | |
| 2002/0056040 A1 | 5/2002 | Simms | |
| 2002/0065732 A1 | 5/2002 | Rodgers et al. | |
| 2002/0183059 A1 | 12/2002 | Noreen et al. | |
| 2002/0194260 A1 | 12/2002 | Headley et al. | |
| 2003/0036948 A1 | 2/2003 | Woodward et al. | |
| 2003/0078986 A1 * | 4/2003 | Ayres et al. | 709/217 |
| 2003/0115146 A1 * | 6/2003 | Lee et al. | 705/57 |
| 2003/0120928 A1 | 6/2003 | Cato et al. | |
| 2003/0163399 A1 * | 8/2003 | Harper et al. | 705/35 |
| 2003/0177490 A1 | 9/2003 | Hoshino et al. | |
| 2003/0182184 A1 | 9/2003 | Strasnick et al. | |
| 2003/0227478 A1 | 12/2003 | Chatfield | |
| 2004/0181591 A1 | 9/2004 | Yu et al. | |
| 2004/0201500 A1 | 10/2004 | Miller et al. | |
| 2004/0203890 A1 | 10/2004 | Karaoguz et al. | |
| 2004/0204063 A1 | 10/2004 | Van Erlach | |
| 2004/0243834 A1 | 12/2004 | Stefik et al. | |
| 2004/0260786 A1 | 12/2004 | Barile | |
| 2005/0021478 A1 | 1/2005 | Gautier et al. | |
| 2005/0026596 A1 | 2/2005 | Markovitz | |
| 2005/0038876 A1 * | 2/2005 | Chaudhuri | 709/219 |
| 2005/0041641 A1 | 2/2005 | Cooley | |
| 2005/0086501 A1 | 4/2005 | Woo et al. | |
| 2005/0108430 A1 | 5/2005 | Howarth et al. | |
| 2005/0114896 A1 | 5/2005 | Hug et al. | |
| 2005/0125831 A1 | 6/2005 | Blanchard | |
| 2005/0131765 A1 | 6/2005 | Rivera et al. | |
| 2005/0131837 A1 | 6/2005 | Sanctis et al. | |
| 2005/0136905 A1 | 6/2005 | Son et al. | |
| 2005/0138193 A1 * | 6/2005 | Encarnacion et al. | 709/230 |
| 2005/0147084 A1 | 7/2005 | Zhang et al. | |
| 2005/0149450 A1 | 7/2005 | Stefik et al. | |
| 2005/0165795 A1 * | 7/2005 | Myka et al. | 707/100 |
| 2005/0188193 A1 | 8/2005 | Kuehnel et al. | |
| 2005/0197906 A1 | 9/2005 | Kindig et al. | |
| 2005/0198299 A1 * | 9/2005 | Beck et al. | 709/226 |
| 2005/0210279 A1 | 9/2005 | Lee et al. | |
| 2005/0266858 A1 | 12/2005 | Miller et al. | |
| 2005/0272442 A1 | 12/2005 | Miller et al. | |
| 2005/0278230 A1 | 12/2005 | Shirasaka et al. | |
| 2005/0278377 A1 | 12/2005 | Mirrashidi et al. | |
| 2005/0286546 A1 | 12/2005 | Bassoli et al. | |
| 2006/0015378 A1 | 1/2006 | Mirrashidi et al. | |
| 2006/0019676 A1 | 1/2006 | Miller et al. | |
| 2006/0079228 A1 | 4/2006 | Marsico et al. | |
| 2006/0085816 A1 | 4/2006 | Funk et al. | |
| 2006/0094406 A1 | 5/2006 | Cortegiano | |
| 2006/0173784 A1 * | 8/2006 | Marples et al. | 705/52 |
| 2006/0173985 A1 * | 8/2006 | Moore | 709/223 |
| 2006/0181982 A1 * | 8/2006 | Villevieille et al. | 369/47.1 |
| 2006/0218613 A1 | 9/2006 | Bushnell | |
| 2006/0242106 A1 | 10/2006 | Bank | |
| 2007/0098165 A1 | 5/2007 | Yoshikawa | |
| 2007/0143492 A1 * | 6/2007 | Flinchem | 709/231 |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2008/0212944 A1 | 9/2008 | Khedouri et al. | |

OTHER PUBLICATIONS

Device Profile for Web Service, Microsoft Corp., May 2005.*

Fritsch, L. "WIFI Hot Spot Superdistribution—A Profit Scheme for WIFI Access Distribution." Mar. 31, 2005. All pages. Retrieved on May 26, 2010. http://www.is-frankfurt.de/publikationenNeu/WiFihotspotsuperdistributiona1349.pdf.*

Rosenblatt et al. "Digital Rights Management: Business and Technology." 2001. M&T Books. New York, N.Y. All pages.*

Swierk et al., "The Roma Personal Metadata Service," Mobile Networks and Applications vol. 7, pp. 407-418, 2002.

Balachandran et al., "Wireless Hotspots: Current Challenges and Future Directions," Mobile Networks and Applications, 10, 2005, pp. 265-274, Springer Science and Business Media, Inc., The Netherlands.

Unknown, "BlueVibe, Location Based Services Platform for Mobile Devices," printed from http://www.bluevibe.gr/bvbrocureEN.pdf, printed on Aug. 29, 2006, 4 pages, Bluebird, Greece.

Unknown, "Tadlys' Bluetooth Wireless Local Network for Hotspots," printed from http://www.tadlys.com/media/downloads/Hotspots%20PVDEE01006-3.PDF, IBM Corporation, 2003, 2 Pages, UK.

Bassoli et al., "tunA: Local Music Sharing with Handheld Wi-Fi Devices," Fifth Wireless World Conference, University of Surrey, 23 pages, Jul. 2004, UK.

Unknown, "The Sound of Starbucks," printed from http://www.hearmusic.com/#ABOUT_US, printed on Sep. 19, 2006, 1 page, Starbucks Corporation, USA.

Unknown, "Vision: Listen Without Limits," printed from http://www.musicgremlin.com/About/Vision/visionListen.aspx, printed on Oct. 12, 2006, 2 pages, MusicGremlin, Inc., USA.

UMnP Forum, UPnP Device Architecture 1.0, Contributing members of the UPnP forum, May 6, 2003, 85 pgs.

* cited by examiner

FIG. 9

- ⊞ PLAYLISTS
- ⊟ JOURNAL
- ⊞ MUSIC
- ⊞ RADIO
- ⊟ MARKETPLACE
  - HOME
  - PLAYLISTS
  - CHARTS
  - ARTISTS
  - ALBUM
  - SONGS
  - GENRE
  - YEAR
  - DOWNLOAD MANAGER
- ⊞ CD/DVD
- ⊞ MEDIA SERVICE

902

| TITLE | ARTIST | ALBUM | ACTION | FROM |
|---|---|---|---|---|
| MEDIADUDE-TODAY 11:42am | | | | |
| PAVEMENT CRACKS | ANNIE LENNOX | BARE | DOWNLOAD | MEDIADUDE |
| VERTIGO | U2 | HOW TO DIS... | DOWNLOAD | MEDIADUDE |
| WHATSERNAME | GREEN DAY | AMERICAN IDIOT... | SEARCH | MEDIADUDE |
| JEETERS-YESTERDAY 2:17pm | | | | |
| SQUARE ONE | COLDPLAY | X&Y | DOWNLOAD | JEETERS |
| WHAT IF | COLDPLAY | X&Y | DOWNLOAD | JEETERS |
| WHITE SHADOWS | COLDPLAY | X&Y | DOWNLOAD | JEETERS |
| FIX YOU | COLDPLAY | X&Y | BUY | JEETERS |
| ▷ TALK | COLDPLAY | X&Y | DOWNLOAD | JEETERS |
| X&Y | COLDPLAY | X&Y | BUY | JEETERS |
| ▷ SPEED OF SOUND | COLDPLAY | X&Y | BUY | JEETERS |
| A MESSAGE | COLDPLAY | X&Y | DOWNLOAD | JEETERS |
| LOW | COLDPLAY | X&Y | DOWNLOAD | JEETERS |
| MARKY MARK-7/12/06 7:56pm | | | | |
| AMERICAN IDIOT | GREEN DAY | AMERICAN IDIOT... | SEARCH | MARKY MARK |
| ▷ HOW TO BE DEAD | SNOW PATROL | FINAL STRAW | DOWNLOAD | MARKY MARK |
| GRAZED KNEES | SNOW PATROL | FINAL STRAW | DOWNLOAD | MARKY MARK |

SUBSCRIPTION MANAGEMENT IN A MEDIA SHARING SERVICE

CROSS-REFERENCE TO RELATED APPLICATION

This application is a continuation-in-part of U.S. patent application Ser. No. 11/475,314, filed Jun. 27, 2006, the entirety of which is hereby incorporated by reference herein for all purposes.

BACKGROUND

Digital media content such as audio, video, and images may be consumed by a user on a variety of devices such as personal computers, personal digital assistants, portable digital media players, gaming consoles, mobile telephones, and the like. Digital media content is typically acquired by a personal computer accessing a digital media service via subscription or pay-as-you-go service models, and then transferred to a portable media device for consumption by the user. The portable media device does not have the standalone ability to access subscription services (e.g., update subscription licenses, update playlists), obtain new content, and/or generally interact with the digital media service. For subscription services, the lack of flexibility may interrupt access to the digital media service (e.g., since monthly licenses are only renewed during a certain period each month). If the user does not connect back to the digital media service during this particular period, the subscription content on the portable media device stops working.

Further, with existing digital media services, it is not possible for third parties to transfer promotional content onto a user's media device. For example, for the user to listen on the user's media device to a compact disc (CD) offered for sale at a local coffee shop, the user has to purchase the CD, take it home to a personal computer, copy the contents of the CD to the personal computer, and then transfer the CD contents from the personal computer to the media device. In addition, while at the local coffee shop, the user has no way to access additional third party services such as photo printing. In this example, the user has to copy the photographs from media device to a CD or a flash memory device for transit to a photo store to print out the pictures.

SUMMARY

Embodiments of the invention enable the creation or renewal of a subscription to a media sharing service. In an embodiment, a media server detects and connects to a computing device within a local communication region. While connected, the media server offers the computing device access to one or more media content items available from the media service. The media server receives an indication of payment from the user and provides one or more of the media content items to the computing device. The indication of payment corresponds, for example, to a new subscription or a renewal of access to the media service.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 9 is an exemplary screen shot of a user interface illustrating metadata obtained from a plurality of users.

Corresponding reference characters indicate corresponding parts throughout the drawings.

DETAILED DESCRIPTION

Embodiments of the invention enable subscription management in a media sharing system. In a media sharing system, a media server in a local communication region provides access to a media service providing one or more media content items. To a user, subscription management includes creating a new subscription, renewing an existing subscription (e.g., a periodic subscription such as monthly), or the like. Alternatively or in addition, subscription management includes enabling a pay-as-you-go model for accessing the media content items available from the media service.

Figure 1:
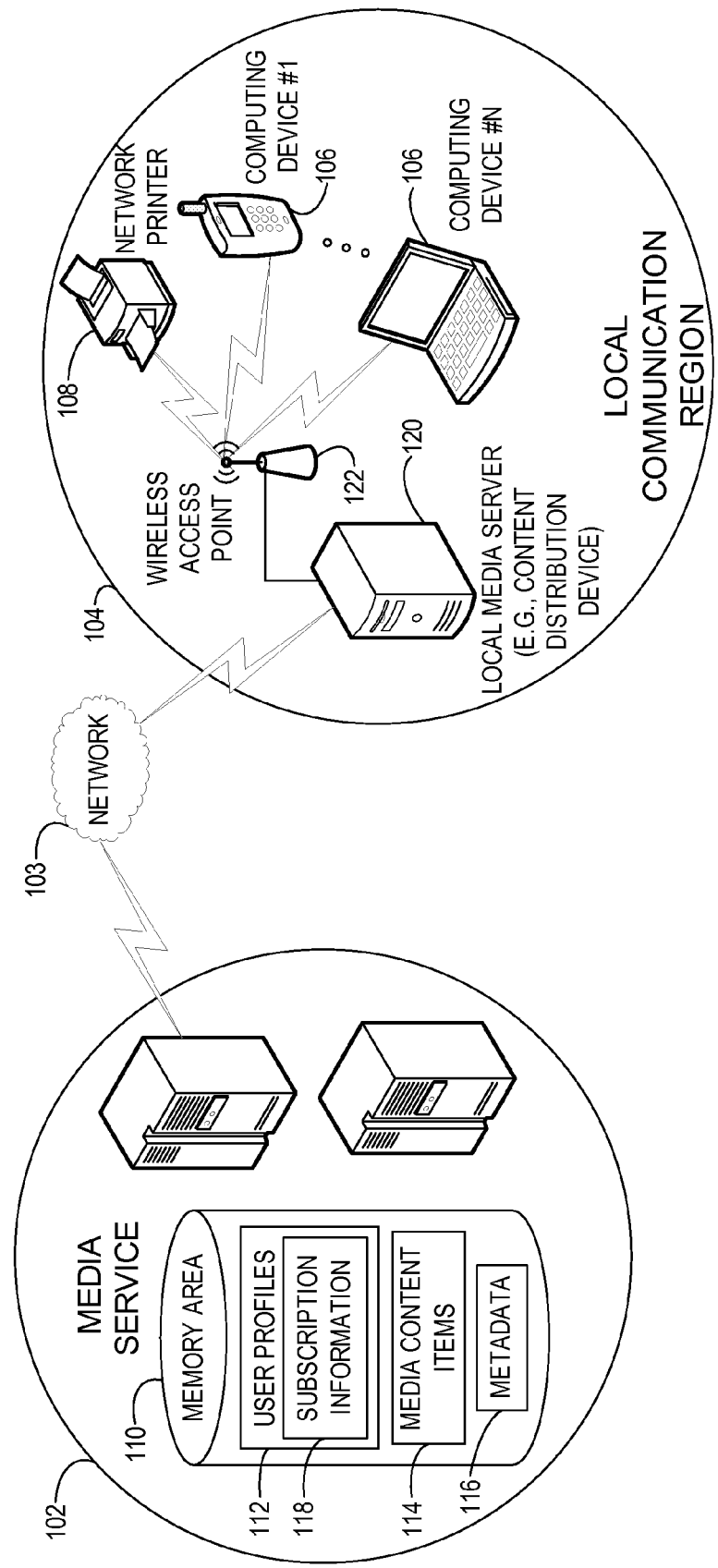
FIG. 1 is an exemplary block diagram illustrating a media service interacting with a local network.

In an embodiment, the invention enables media content sharing between entities such as shown in FIG. 1. From a user perspective, a diverse social network is developed and the chore of discovering digital media content is reduced in a secure, legal, unobtrusive manner. Users are presented with abundant and flexible options for customization and control of discovery and distribution. For example, asynchronous distribution transactions between users may occur with or without active user participation, allowing a user to manage disruptions associated with digital content discovery and distribution. In another example, a user may limit (or expand) participants with whom, and venues within which, distribution transactions may occur.

Aspects of the invention enable transparent cross-pollination of users' media libraries with each other, and from other entities such as retail stores based on physical proximity (e.g., see FIG. 1). Media players with wireless networking connections may establish peer-to-peer connections with each other and transfer content on behalf of the user. With aspects of the invention, individual users may act as disc jockeys by selecting music to promote by distributing it to others. As such, media content may be distributed in a viral way based on the media library and preferences of users that come in proximity to each other and other entities.

Referring first to FIG. 1, an exemplary block diagram illustrates a media service 102 interacting with a local communication region 104 via a network 103. In an embodiment, the local communication region 104 is a wireless network located, for example, at a retail establishment such as a coffee shop or airport. Users connect to the local communication region 104 via computing devices 106 to initiate or renew subscription licenses to the media service 102, access promotional content, update playlists, purchase media content, play games, and the like.

In an example, user profiles 112 stored by the media service 102 include a plurality of playlists. Users receive updated versions of the playlists on their computing devices 106 each time the users connect to the local communication region 104, if an updated version is available. In an embodiment, the playlists comprise metadata identifying a set of media content items.

Users may also use the local communication region 104 to access third party resources supported by an operator of the local communication region 104. The resources may include, for example, printing photographs or other data directly from the user's computing device 106 on a local network printer 108, accessing the Internet, and projecting photographs and/or video to a wireless projector or display at the retail establishment.

The media service 102 in FIG. 1 provides media content and related services to local communication regions such as local communication region 104. Users subscribe to the media service 102 to have access to the services offered by the media service 102. Subscribers to the media service 102 may pay a monthly or yearly fee for access to the media service 102. Alternatively, a pay-as-you-go model may be employed in which users pay on a per-transmission basis for access and connection to the media service 102. In yet another embodiment, the media service 102 is supported entirely or in part by advertisements inserted into transmissions from the media service 102.

The media service 102 includes a memory area 110 storing user profiles 112, media content items 114, and associated metadata 116. The user profiles 112 include subscription information 118 describing the user's subscription to the media service 102 (e.g., renewal dates and type of subscription). In an embodiment, the subscription information 118 is populated upon creation of a new subscription for a user. For example, after connecting to the local communication region 104, the media server 120 offers the computing device 106 access to the media content items 114. Offering includes any form of presenting an opportunity for the user to access the goods and services of the media service 102 via the local media server 120. For example, the local media server 120 may provide the computing device 106 with a user interface such as a popup window or dialog indicating that the media service 102 is available. Upon acceptance by the user of the offer (e.g., the user clicks on the appropriate prompt or clicks on a hyperlink), the computing device 106 is able to access the media content items 114 from the media service 102 via the local media server 120. In addition, the computing device 106 may be able to access any services available from the local media server 120 (e.g., printing, Internet access).

Upon receipt of an indication of payment from the user (e.g., via computing device 106), the subscription information 118 is populated. The indication of payment includes, for example, a credit card payment, a debit card payment, an electronic funds transfer, or other payment.

If the user is already a subscriber, a payment status associated with the subscription information 118 is determined by the local media server 120 by communicating with the media service 102. The payment status indicates, for example, that the user account is paid-in-full, or a balance is due if continued access to the media service 102 is desired. The payment status also indicates whether a renewal is currently available to the user. After providing or presenting the payment status to the user, the media server 120 receives an indication of payment from the user for access to the media service 102. In such an embodiment, the indication of payment represents a renewal to the subscription. The subscription information 118 is updated, and the media content items 114 are available from the media service 102.

The media content items 114 include, but are not limited to, audio, video, still images (e.g., full- or partial-length songs and movies, video clips or shorts, recorded television, and product commercials), and a journal, history, or list of media content. In an embodiment, each of the media content items 114 each has a digital rights management policy associated therewith.

The metadata 116 describes the media content items 114 and includes, for example, information related to album, artist, title, track, and album art. While metadata 116 is described and shown as separate from the media content items 114 in FIG. 1, some of the metadata 116 may be part of the media content items 114 (e.g., stored in a header). Further, while FIG. 1 illustrates the media content items 114 and metadata 116 as being stored in the memory area 110 local to the media service 102, the media content items 114 and metadata 116 may be stored remotely from the media service 102 and be part of a third-party system. In such an embodiment, the media service 102 has a relationship with, and access to, the third-party system to provide the media content items 114 to the local communication region 104.

The exemplary local communication region 104 illustrated in FIG. 1 includes a local media server 120 (e.g., a content distribution device) connected to the network 103 and to one or more wireless access points 122. The network 103 links the local communication region 104 to the media service 102 and, in an embodiment, to a wide area network such as the Internet. The local media server 120 includes software for connecting to the media service 102, software for connecting with computing devices 106, and, in an embodiment, a local copy of a content catalog downloaded from the media service 102. The content catalog reflects the media content items 114 that are available from the media service 102. Devices connect to the wireless access point 122 when within the local communication region 104. Exemplary devices include computing devices 106 such as computing device #1 through computing device #N, and the network printer 108. Exemplary computing devices include a mobile telephone, a personal data assistant, a portable digital media player, a laptop, and a personal computer. The computing devices 106 include any device, or any physical or logical element of such a device, separate from or included in other devices.

The local communication region 104 corresponds to any zone or network such as a media service access zone, local area network, wide area network, or personal area network, and may include any number of devices therein. For example, the local communication region 104 may include only two computing devices 106 (see FIG. 4). Wide area networks and local area networks are widely known. The personal area network represents any technology or system usable for direct communication between the computing devices 106 close to a particular person, device, or entity. An access point such as the wireless access point 122 may be part of such communication in an embodiment, but is not required to enable such communication in other embodiments. Personal area network technologies or systems may be used to connect to other local area networks or wide area networks. The reach of a personal area network may be a few meters. In an embodiment, the personal area network employs a wireless cable replacement technology. Wireless cable replacement technologies are generally identified by the air interface protocols used for communication between computing devices 106. Existing air interface protocols include BLUETOOTH, Wireless USB, and various proprietary protocols. Such air interface protocols may also be used to create wireless cable replacement topologies.

The local media server 120 in FIG. 1 includes a processor configured to execute computer-executable instructions for connecting the computing devices 106. In an embodiment, the processor operates to detect one of the computing devices 106 when the computing device 106 enters the local communication region 104 or otherwise comes within a predefined proximity of the local media server 120 or the wireless access point 122. The local media server 120 establishes a wireless connection to the detected computing device 106 and receives a user identifier from the connected computing device 106. The user identifier is used by the local media server 120 to authenticate, or enable the media service 102 to authenticate, the user of the computing device 106. Authentication includes, for example, checking the subscription information 118 or other user profile information stored in the memory area 110 of the media service 102 for the received user identifier. Establishing the wireless connection occurs, for example, without any user input, or without explicit user input. In an example, the user may have previously indicated a preference to connect upon entering a local communication region.

After authentication, the user has access to the media service 102 (e.g., media content items 114) and to one or more of the local services offered by the operator (e.g., printing). In an embodiment, the user has access to only the services offered by the media service 102 that have been paid for by the user (e.g., as specified in the user profile 112) and any additional services offered by the operator of the local communication region 104.

While connection of the computing device 106 and authentication of the user occurs automatically in an embodiment, such connection and authentication may occur only in response to a specific request from the user in other embodiments. In such embodiments, the operator broadcasts a list of services available within the local communication region 104. Responsive to a request from the user to connect, the local media server 120 connects to the computing device 106, authenticates the user, and provides access to the media service 102 and any available local services.

The local media server 120 further operates to provide access, based on the authentication status of the user (e.g., successfully authenticated or not), to the memory area 110 associated with the media service 102 for the particular user to update the subscription information 118 stored in the user profile 112 associated with the particular user, or access any other service offered by the media service 102. The local media server 120 also provides one or more of the media content items 114 and associated metadata 116 from the media service 102 to a computer-readable medium associated with the computing device 106. The one or more of the media content items 114 are selected by the operator of the local communication region 104 based on customer demand (e.g., interest, demographics, etc.). The selected media content items 114 are provided to the computing device 106 with a digital rights management policy associated therewith. For example, the policy allows three renderings of each of the media content items 114 over three days, before the media content items 114 are erased from the computing device 106 or otherwise rendered unplayable.

Aspects of the invention provide a subsequent purchase opportunity to the user to purchase the media content items 114 sent to the computed device. The purchase opportunity may occur, for example, when the user subsequently connects the computing device 106 to the Internet and views the metadata 116 associated with the provided media content items 114. The purchase opportunity occurs within in the local communication region 104, or outside the boundaries of the local communication region 104.

The operator or provider of the local communication region 104 (e.g., a retail establishment) provides access to the media service 102 for customers of the operator by acquiring a business subscription to the media service 102. Such a subscription enables the operator to uniquely brand the local communication region 104 (e.g., Joe's Coffee Shop Media Access Zone) for marketing purposes. For example, when a user enters the local communication region 104, the operator name and branding appear on the user's computing device 106. In an embodiment, the operator streams or downloads media content from the media service 102 to connected computing devices 106. By subscribing to the media service 102, the operator no longer needs to store local copies of the media content (e.g., compact discs, digital versatile discs) in an embodiment. Further, with access to the large repository of media content items 114 from the media service 102, the operator may offer a large variety of content to entice customers to visit or enter the local communication region 104. For example, the operator may target customers with selected media content (e.g., jazz music at a coffee shop, easy listening music at a winery, new age music at a candle shop, alternative rock at a snowboard store).

In addition, the operator is credited with a portion of the sale proceeds or otherwise rewarded by the media service 102 if the user subsequently purchases any of the downloaded media content items 114. This may be accomplished by associating an identifier with the operator, and including this identifier with the media content items 114 downloaded to the user's computing device 106. During a purchase opportunity (e.g., when the computing device 106 is connected to another computing device 106 such as a personal computer), the user views the metadata 116 associated with the downloaded media content items 114 and has the ability to purchase any of the media content items 114. In purchasing the media content items 114, the metadata 116 associated with the desired media content items 114 is sent to the media service 102 along with the identifier of the operator of the local communication region 104 in which the promotional media content items 114 were downloaded to the user's computing device 106. In this manner, the operator is identified and rewarded by the media service 102 for introducing the user to the purchased media content items 114.

Alternatively or in addition, the operator may transmit advertisements to the connected computing devices 106 within the local communication region 104. The advertisements may be designed for rendering, for example, before the content is consumed (e.g., at the beginning of music playback), after rendering completes, or at connection time. For example, when the user connects to the local communication region 104, the operator inserts a media advertisement that is presented to the user before the list of available services is displayed to the user. In another example, when the user selects an available service, the operator inserts a media advertisement that is presented to the user before the selected service is provided. In yet another example, the operator may insert advertisements at any point in the streaming or downloading of the media content to the computing device 106.

Alternatively or in addition, the operator of the local communication region 104 may upload or otherwise identify selected media content items 114 to the media service 102. The media service 102 then makes the selected media content available at all or selected local communication regions related to the operator (e.g., all company-owned stores, or franchised locations).

Figure 2:
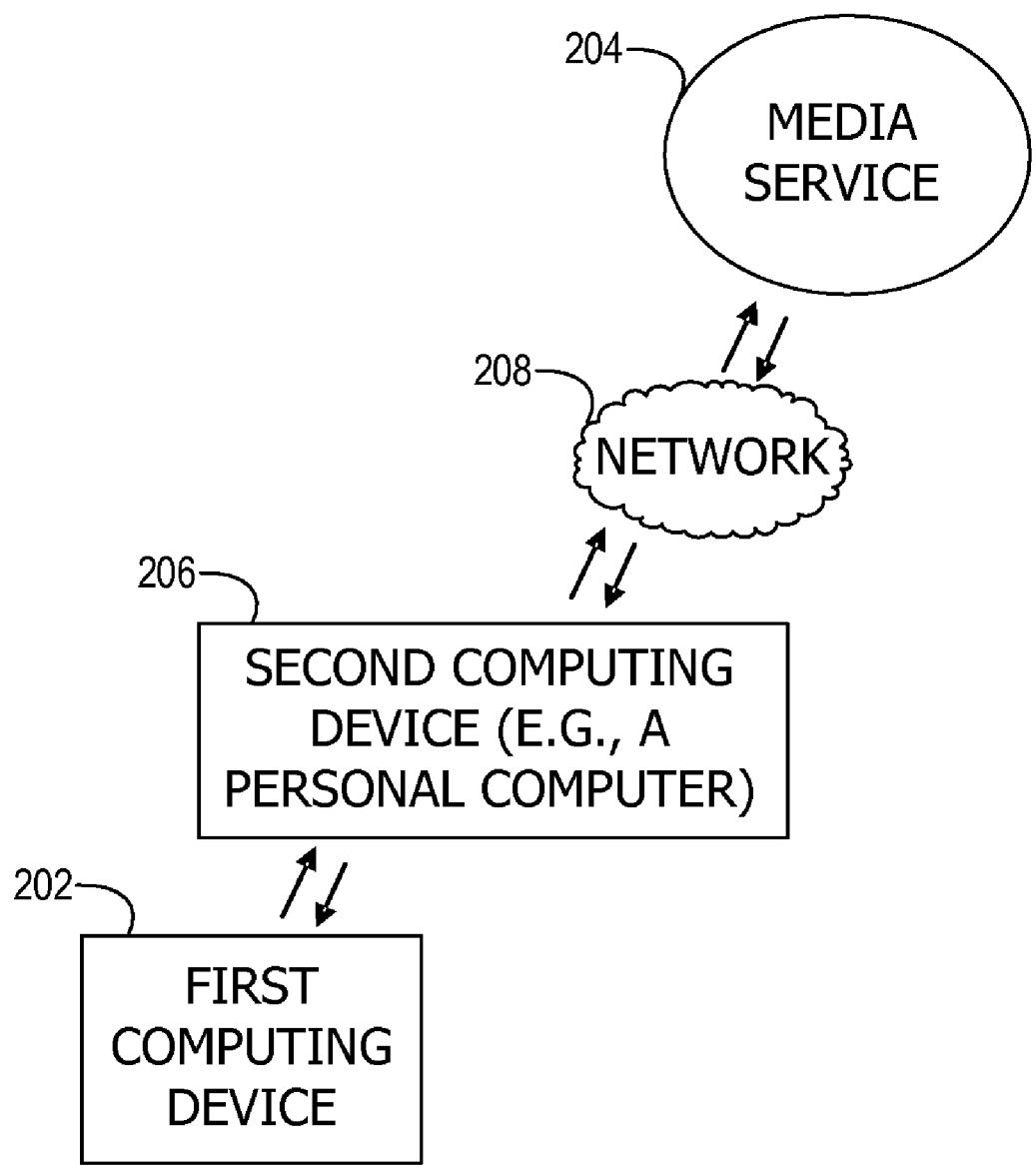
FIG. 2 is an exemplary block diagram illustrating communication between a computing device and the media service.

Referring next to FIG. 2, an exemplary block diagram illustrates communication between a first computing device 202 and a media service 204 (e.g., such as media service 102 in FIG. 1) via a second computing device 206. For example, the first computing device 202 represents a portable digital media player and the second computing device 206 represents a personal computer. Such a configuration occurs when the user of the first computing device 202 leaves a local communication region such as in FIG. 1 and connects the first computing device 202 to the second computing device 206. The metadata received by the first computing device 202 from the media service 204 while in the local communication region (e.g., FIG. 1) is synchronized with the second computing device 206. The second computing device 206 connects to the media service 204 via a network 208 such as the Internet. In this manner, the user may purchase, via the second computing device 206, any of the promotional media content items downloaded or streamed from the media service 204. Alternatively or in addition, the first computing device 202 may establish a connection with the media service 204 exclusive of the second computing device 206, and purchase the media content items directly.

Figure 3:
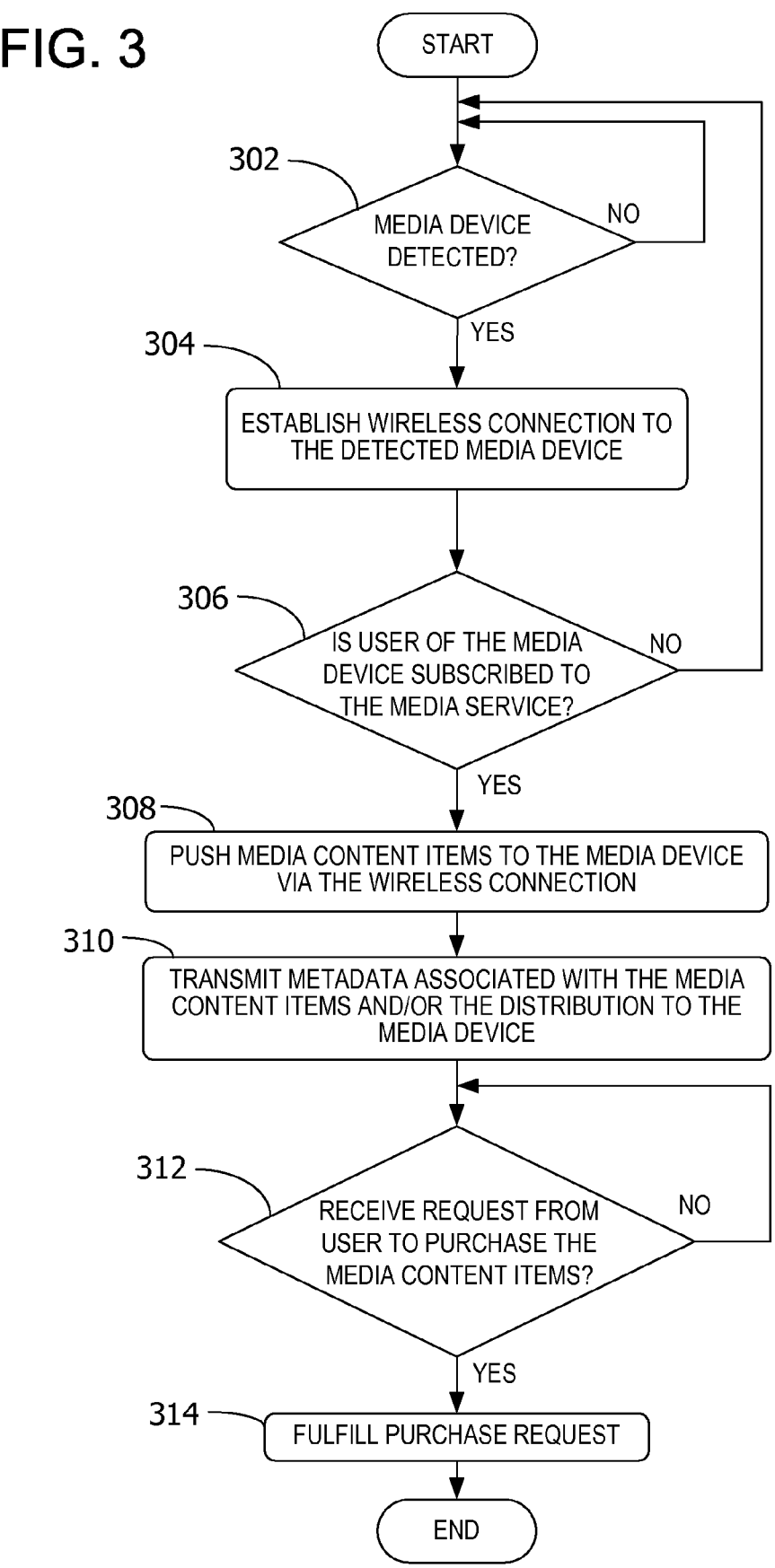
FIG. 3 is an exemplary flow chart illustrating operation of media content sharing between two computing devices.

Referring next to FIG. 3, an exemplary flow chart illustrates operation of media content sharing. The operations illustrated in FIG. 3 may be performed by a local media server such as shown in FIG. 1, or by a computing device associated with a user in which media content is shared between the computing devices of two users. At 302, the process loops until a media device is detected. If a media device associated with a user is detected within a predefined proximity at 302, a wireless connection is established with the detected media device at 304. Authentication of the user is performed by determining at 306 is the user of the media device is subscribed to the media service. If the user is not a subscriber, the process continues at 302. If the user is determined to be a subscriber at 306, one or more media content items are pushed or otherwise provided to the media device via the wireless connection at 308. In addition, metadata associated with the provided media content items is transmitted to the media device at 310. A subsequent purchase opportunity is provided to the user to purchase the transmitted media content items via the transmitted metadata. The subsequent purchase opportunity is provided independent of the predefined proximity. For example, the purchase opportunity may occur within the predefined proximity or outside the predefined proximity. If a request to purchase the provided media content items is received at 312, the purchase request is fulfilled at 314.

In an embodiment, a digital rights management policy is associated with the media content items. In such an embodiment, transmitting the media content items to the detected computing device includes transmitting the media content items with the associated digital rights management policy associated therewith to the computing device. A component of the digital rights management policy may direct, for example, that the transmitted media content items are to be deleted or otherwise not renderable after a particular date (e.g., an expiration date). While the media content items may be deleted, however, the metadata associated with the media content items is not deleted and remains to enable the user to purchase the media content items.

In a peer-to-peer embodiment, the operations illustrated in FIG. 3 are performed by a first computing device. In particular, the first computing device detects a second computing device within a predefined proximity. The first computing device is associated with a first user and the second computing device is associated with a second user. The first user is subscribed to the media service. The first computing device establishes a peer-to-peer wireless connection to the second computing device responsive to detecting the second computing device. The first computing device determines if the second user is subscribed to the media content service. Such a determination occurs with or without a connection to the media service. For example, the first computing device may interrogate the second computing device for a valid certificate or key (e.g., time-sensitive) which was provided to the second computing device upon subscription of the second user to the media service. The first computing device has the capability to analyze the certificate or key to determine if the second user is a current subscriber to the media service. If the second user is determined to be a subscriber to the media service, the first computing device shares one or more media content items and associated metadata with the second computing device via the established wireless connection. The sharing may occur by streaming the media content items where, upon receipt (e.g., within the predefined proximity), the second computing device renders the streamed media content items to the second user. Alternatively or in addition, the sharing may occur by downloading the media content items to the second computing device. The metadata may be used as a subsequent purchase opportunity for the second user to purchase the shared media content items (e.g., when connecting to a personal computer connected to a network capable of accessing the media service).

The metadata transmitted with the media content items describes the media content items and describes the transaction. Such metadata includes, but is not limited to, album, artist, title, track, and album art. Further, metadata includes information about the distribution of the media content items: a date associated with transmission of the media content item to the computing device, the parties involved in the transmission, identification of the media content items transferred with a particular media content item, identification of a local communication region where the transmission took place, and the like. The metadata is used to select media content items for purchase as well as to identify the party responsible for the promotional transmission of the media content item (e.g., to reward or give feedback to the responsible party). The metadata may be stored with the media content items or stored separately (e.g., in a different folder).

Alternatively or in addition, the metadata includes actionable items such as hyperlinks to enable purchase of one or more of the media content items received during the encounter illustrated in FIG. 3.

In an embodiment, metadata is also stored on the transmitting user's computing device describing the transaction. For example, the metadata identifies the user that received media content items, the local communication region where the media sharing occurred, and other transaction information.

Embodiments of the invention may be implemented with computer-executable instructions performing operations such as illustrated in FIG. 3. The computer-executable instructions may be organized into one or more computer-executable components or modules. Aspects of the invention may be implemented with any number and organization of such components or modules. Generally, program modules include, but are not limited to, routines, programs, objects, components, and data structures that perform particular tasks or implement particular abstract data types. For example, aspects of the invention are not limited to the specific computer-executable instructions or the specific components or modules illustrated in the figures and described herein. Other embodiments of the invention may include different computer-executable instructions or components having more or less functionality than illustrated and described herein. Computer-executable instructions implementing aspects of the invention may be separate from, or included with, other computer-executable instructions executed by the computing device. For example, aspects of the invention may be implemented within a media player executing on the computing device, or as a separate program executing on the computing device.

Figure 4:
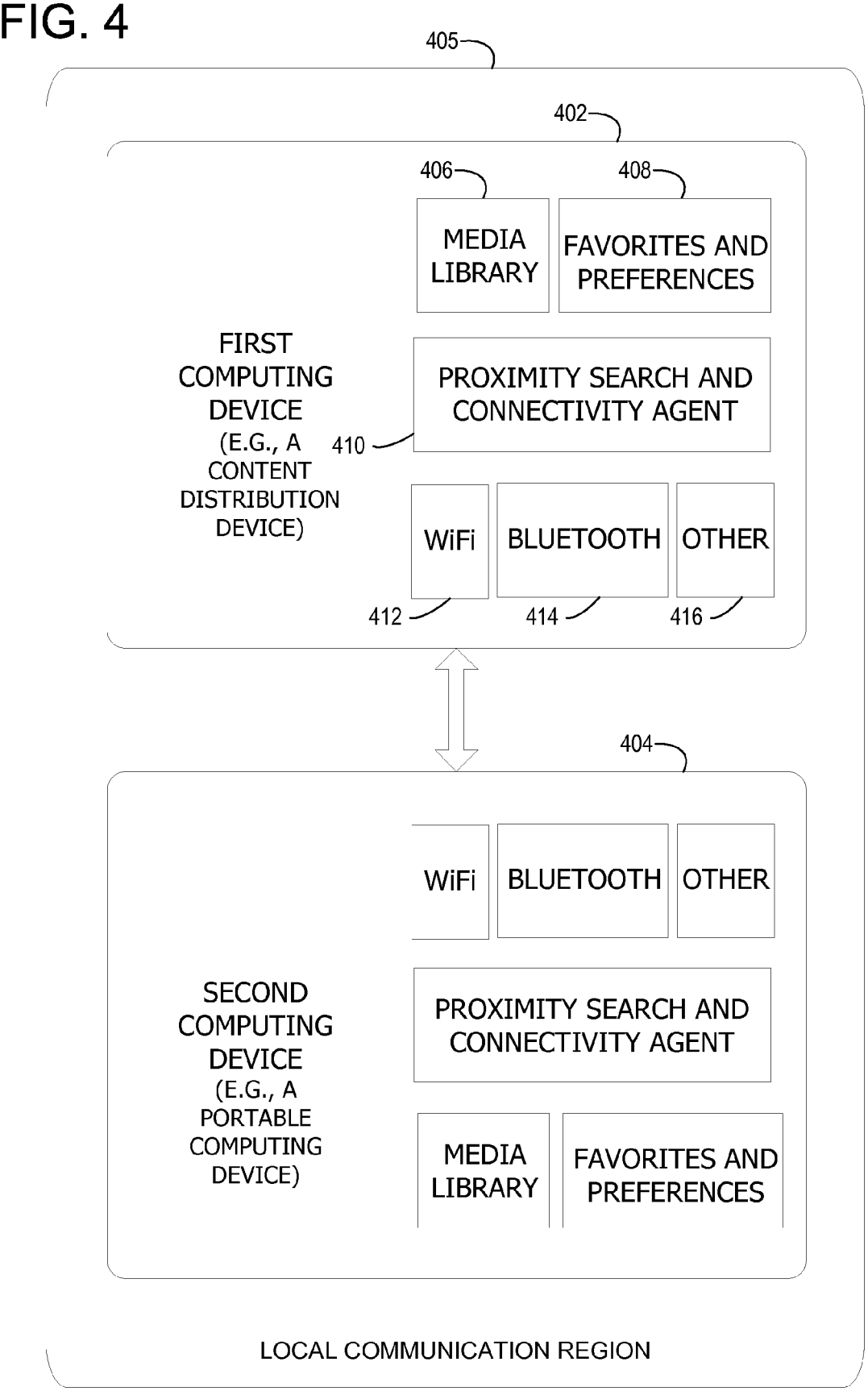
FIG. 4 is an exemplary block diagram illustrating a peer-to-peer connection between two computing devices within a local communication region.

Referring next to FIG. 4, an exemplary block diagram illustrates a peer-to-peer connection between two computing devices 402, 404. In particular, a first computing device 402 (e.g., a content distribution device) associated with a first user establishes a peer-to-peer connection with a second computing device 404 (e.g., a portable computing device) associated with a second user. The connection illustrated in FIG. 4 occurs within a local communication region 405. The peer-to-peer communication session represents any local, peer-to-peer physical or virtual connection between the computing devices. The connection may be wired, wireless, or any combination thereof, and may be implemented by one or more communication protocols and/or bridging techniques for enabling communication between various protocols. Aspects of the invention as described herein are not limited to any specific protocols or network layers, but are compatible via an abstraction layer (such technique is known in the art) to support any protocol or network layer.

The first computing device 402 has a media library 406, a list of favorites and preferences 408, a proximity search and connectivity agent 410, and interfaces for connecting to other devices via, for example, wireless fidelity (WiFi) 412, BLUETOOTH 414, and other protocols or network layers 416. The media library 406 identifies the media content items stored on the first computing device 402. In an embodiment, the media library 406 is capable of resolving digital license issues such as transparently obtaining suitable license rights to playback content received during a proximity distribution transaction. The second computing device 404 has a similar set of components. Both the first and second computing devices 402, 404 broadcast their availability for media sharing connections and scan for available devices (e.g., via the proximity search and connectivity agents such as proximity search and connectivity agent 410).

The first user and second user each identify digital content distribution criteria or otherwise determine what media content to share with which other users. This information is stored, for example, in the favorites and preferences components (e.g., favorites and preferences 408). Examples of digital content distribution criteria include, but are not limited to, information regarding one or more of the following: listening habits; purchasing habits; ratings; user-defined favorites; recently purchased content; user profiles (e.g., personal information such as name, address, gender, and age); service profiles (e.g., whether a user has opted-in to participation local, peer-to-peer distribution transactions and opt-in conditions, if any); user affiliations (e.g., buddy lists); device-gathered location information; digital rights management information associated with the media content items (e.g., whether a user has the right to distribute a particular media content item, or any restrictions on such rights); and other data. The digital content distribution criteria may be combined (e.g., via Boolean operands) to create expressions for evaluation when determining whether to share media content items with a particular user. The digital content distribution criteria may also include or be affected by other criteria such as remaining memory storage and battery life of the device (e.g., do not accept large songs, and do not exhaust the battery by accepting content if the battery level is low). The set of media content items to be shared may be user-defined, auto-generated based on other factors (e.g., listening habits), or a combination of both.

The first and second computing devices 402, 404 each continually or continuously scan to detect devices within a predefined proximity (e.g., local communication region 405). In an implementation, detecting another computing device includes implementing one or more features of a local networking service defined by the Universal Plug and Play peer-to-peer connectivity architecture ("UPNP Architecture"). Alternatively or in addition, detecting the computing device includes implementing one or more features of a service defined by the Web Services Dynamic Discovery ("WS-Discovery") protocol. This protocol defines how services are discovered (e.g., by a simple network access protocol) on a local network. Other implementations are also possible, such as customized BLUETOOTH profiles, and Zero Configuration Networking ("ZeroConf") techniques.

In an embodiment, detecting another computing device includes discovering, and determining the proximity of, potential participants a communication session. Proximity determination includes one or more acts, criteria, or the like for determining whether two computing devices are available for communication (e.g., within a predefined proximity or distance). Proximity may be defined as broadly or narrowly as desired, encompassing everyone/every device or only select entities or devices. Proximity may be determined on a periodic basis, and may result in identification of a set of proximate devices and/or entities. In an embodiment, the boundaries of the local communication region 405 define the limits of the predefined proximity. For example, whenever two computing devices are within the local communication region, proximity is deemed to exist.

In another example, proximity is deemed to exist when two or more computing devices are within static or dynamic physically definable sub-regions of the local communication region 405. Examples of static, physically definable sub-regions of the local communication region 405 include particular geographical regions such as departments of retail locations (e.g., music sales departments), streets, or buildings. An example of a dynamic, physically definable sub-region of the local communication region 405 includes a predetermined maximal distance between two computing device. Various commercially available systems and/or products may be used for location determination. Such systems and/or products are generally based on technologies such as global positioning system (GPS) technology, triangulation technology, signal strength analysis technology, time-distance-of-arrival technology, or the like.

Other circumstances under which two or more computing devices may be deemed to be in proximity are defined by one or more logical relationships between the computing devices. For example, two computing devices within the local communication region 405 or sub-regions thereof that have predetermined zip codes, genders, ages, preferences (e.g., music preferences), friends, or other logically relatable characteristics may be deemed to be in proximity.

After detecting each other, the first and second computing devices 402, 404 each play a particular role in an exemplary transaction. For example, the first computing device 402 may take the role of a publisher agent and expose a set of media content items from the media library 406 of the first user. The second computing device 404 may take the role of a recipient agent. The first computing device 402 (e.g., publisher agent) selects one or more media content items from the media library 406 based on the substance of the favorites and preferences component in the second computing device 404 (e.g., an evaluation of the digital content distribution criteria in the second computing device 404). For example, the first computing device 402 receives the digital content distribution criteria from the second computing device 404 upon establishing the peer-to-peer connection. Media content items from the media library 406 in the first computing device 402 that satisfy the criteria from the second computing device 404 are identified and transferred to the second computing device 404 over the established peer-to-peer connection. In addition, metadata describing the transferred media content items and describing the transaction are sent to the second computing device 404. For example, the metadata may specify that a particular song came from John's media library, and was purchased by John from ACME Music Service.

The interaction described with reference to FIG. 4 is repeated as the first and second computing devices 402, 404 individually move from one local communication region (e.g., local communication region 405) to another. The criteria defined in the favorites and preferences components (e.g., favorites and preferences 408) of the two computing devices may be met by other devices in some local communication regions, and not met in others.

FIG. 4 shows one example of a general purpose computing device having one or more processors and a system memory. The computing device typically has at least some form of computer readable media. Computer readable media, which include both volatile and nonvolatile media, removable and non-removable media, may be any available medium that may be accessed by the computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. The modulated data signal has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Aspects of the invention include the computing device itself when programmed according to the methods and techniques described herein.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environments. Examples of well known computing systems, environments, and/or configurations that may be suitable for use with aspects of the invention include, but are not limited to, personal computers, server computers, hand-held or laptop devices, personal digital assistants, multiprocessor systems, microprocessor-based systems, set top boxes, programmable consumer electronics, digital broadcast television recording devices, portable digital media players, gaming consoles, mobile telephones, network PCs, minicomputers, mainframe computers, distributed computing environments that include any of the above systems or devices, and the like.

Figure 5:
FIG. 5 is an exemplary embodiment of a computing device user interface identifying users that are near the computing device.

Referring next to FIG. 5, an exemplary embodiment of an aspect of the invention includes a computing device user interface 504 identifying users that are near the computing device 502. While the computing devices illustrated in FIG. 5, FIG. 6, FIG. 7, and FIG. 8 correspond to a portable digital media player, the user interfaces displayed therein are applicable to any computing device (e.g., mobile telephone, personal digital assistant, etc.). In FIG. 5, the user interface 504 displays the users or device names that have been detected by the computing device 502 and determined to be "nearby" or within a predefined proximity. In this example, the users or device names "Bill," "Alfred," "Henry," and "Mildred" have been detected. The user of the computing device 502 interacts with the user interface 504 to select one or more of the displayed users or device names to investigate media content stored on the detected devices.

The user interface 504 in FIG. 5 appears when the user of the computing device 502 has set a preference or otherwise indicated that explicit consent is required before media content sharing occurs between the computing device 502 and any of the detected devices.

Figure 6:
FIG. 6 is an exemplary embodiment of a computing device user interface identifying media service access zones that are near the computing device.

Referring next to FIG. 6, an exemplary embodiment of an aspect of the invention includes a computing device user interface 604 identifying media service access zones that are near the computing device 602. The media service access zones or other local communication regions are listed in the user interface 604 on the computing device 602. The user selects one or more of the proximal, detected zones via the user interface and connects to the selected zone to access the services offered by the selected zone.

Figure 7:
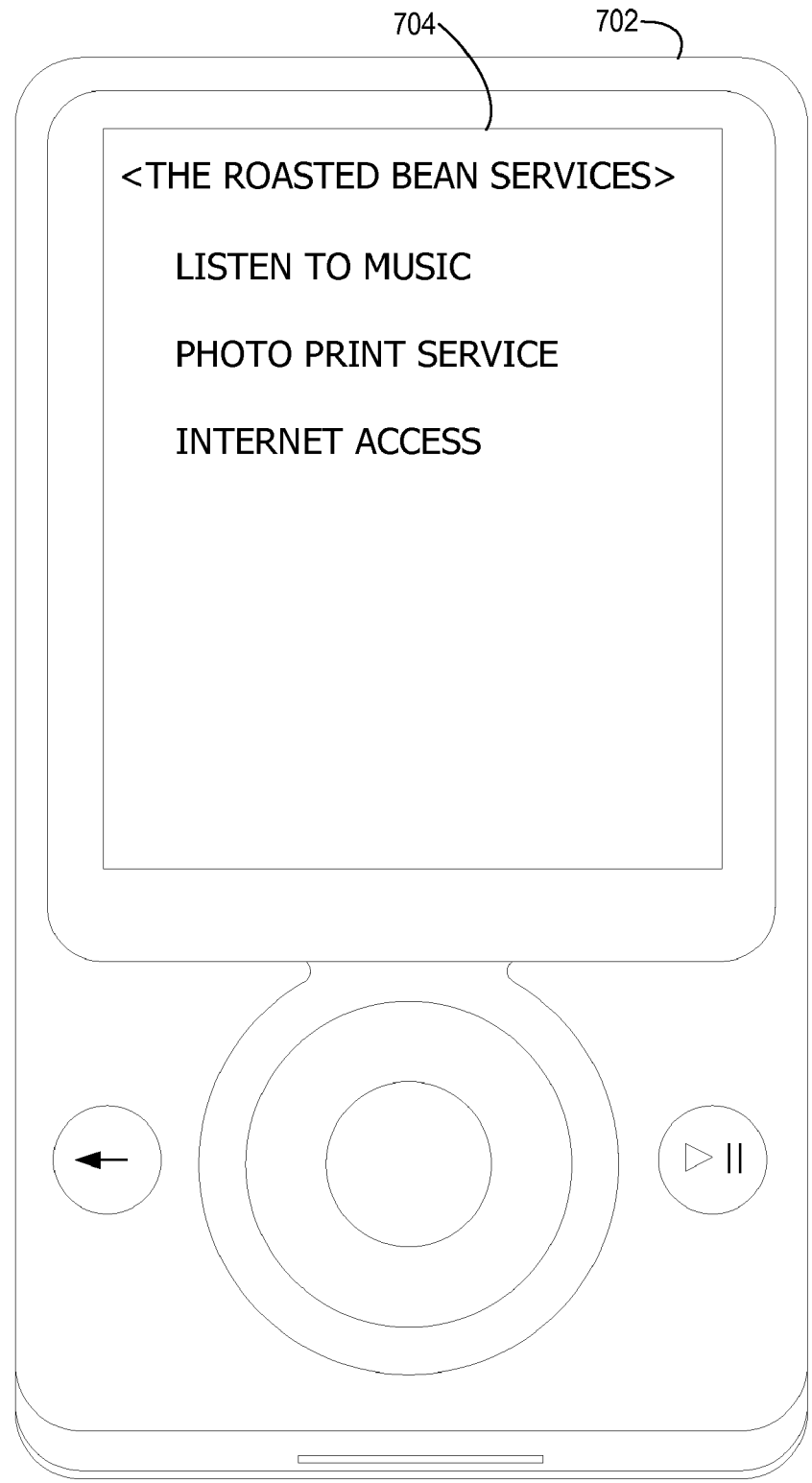
FIG. 7 is an exemplary embodiment of a computing device user interface identifying services offered by a particular media access service zone.

Referring next to FIG. 7, an exemplary embodiment of an aspect of the invention includes a computing device user interface 704 on a computing device 702 identifying services offered by a particular media access service zone. After selection of the zone (e.g., see FIG. 6), a list of services available within the selected zone is displayed on the user interface 704. In this example, the user is able to listen to music selected by the local zone, print a photograph locally, or connect to the Internet.

Figure 8:
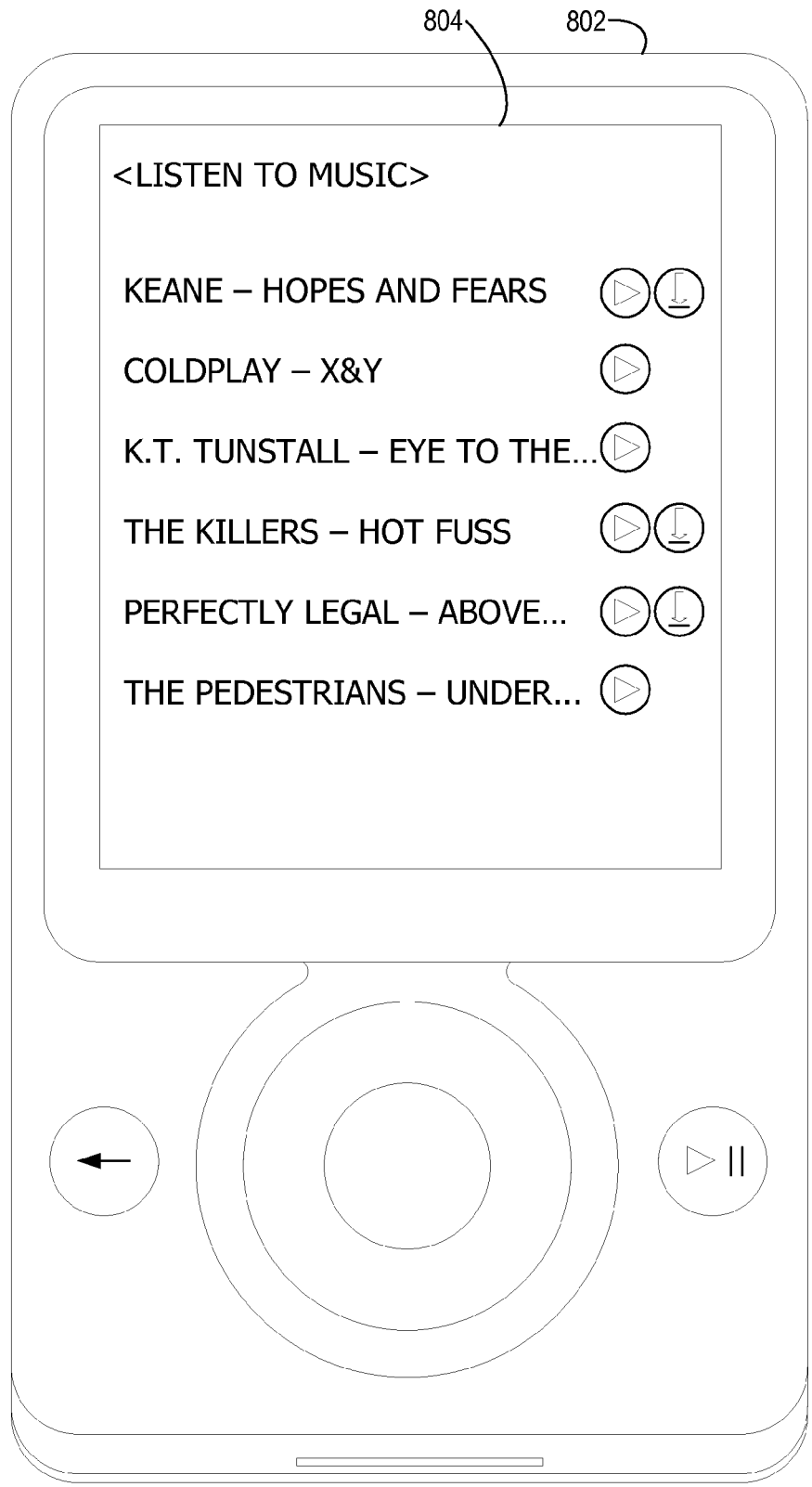
FIG. 8 is an exemplary embodiment of a computing device user interface identifying the media content items that are available to the computing device while connected to a media access service zone.

Referring next to FIG. 8, an exemplary embodiment of an aspect of the invention includes a computing device user interface 804 identifying the media content items that are available to the computing device 802 while connected to a media access service zone. After selection of the 'Listen to Music' service (e.g., see FIG. 7), the user interface 804 displays a list of the media content items that are available to the computing device 802. In the example of FIG. 8, the play icon or button (e.g., triangle within a circle) next to a particular media content item indicates that that media content item is available for streaming and immediate rendering on the computing device 802. The download icon or button (e.g., arrow pointing down within a circle) next to a particular media content item indicates that a promotional copy of the media content item is available for downloading and storage on the computing device 802. When the user selects a media content item that has both icons, the user is given the choice of either streaming the media content item or copying the media content item to their device 802. If only one of the icons appears next to the media content item, the operation corresponding to the appearing icon is automatically selected (e.g., "X&Y" by Coldplay will automatically be streamed upon selection of this song by the user).

Referring next to FIG. 9, an exemplary screen shot 902 of a user interface illustrates metadata obtained from a plurality of users. In an embodiment, the screen shot 902 corresponds to a journal or inbox within a media player. The contents of the screen shot 902 may be presented within the context of any other application program including, for example, an Internet browser, and may also be presented as a standalone application program.

The screen shot 902 in FIG. 9 shows the encounters with other users that the user has had, along with a list of the media content items shared by the other users. In this example, the user has had encounters with Mediadude, Jeeters, and Marky Mark. Mediadude shared songs by Annie Lennox, U2, and Green Day. Jeeters shared songs by Coldplay. Marky Mark shared songs by Green Day and Snow Patrol. Some of the songs have been flagged by the user (e.g., as songs of particular interest).

A purchase opportunity is provided for several of the songs as shown in the Action column. The "download" action indicates that the particular media content item was streamed to the user's device, and a copy is available for purchase and downloading. The "buy" action indicates that a local copy (e.g., promotional copy) of the particular media content item is stored on the user's computing device, but the digital rights management information associated with the particular media content item indicates that a non-promotional copy of the particular media content item has not been purchased by the user. The "search" action indicates that the particular media content item is not available for purchase from the media service.

The following examples further illustrate aspects of the invention. In a first example, the user receives streamed media content and subsequently purchases the streamed media content. In this example, the user connects the computing device to a local communication region at a coffee shop. The user views the selected services available at the coffee shop (e.g., "The Roasted Bean"). The user previews promotional content being streamed by coffee shop over the local communication region. Metadata describing the streamed, promotional media content is copied to the user's computing device along with an identifier associated with the coffee shop (e.g., "The Roasted Bean"). The user leaves the coffee shop, thereby disconnecting from the local communication region.

At home, the user connects the computing device to a personal computer that initiates a synchronization of the metadata from the computing device to the personal computer. After synchronization completes, the user opens a journal or inbox (e.g., see FIG. 9) on the personal computer and navigates to the entry for the coffee shop. All the media content that was streamed to the computing device while at the coffee shop is listed with the option to purchase the streamed media content. The user selects a few of the media content items and purchases them. The purchase request, along with the identifier of the coffee shop, is sent to the media service. The media service identifies that "The Roasted Bean" coffee shop recommended the media content items to the user, and credits a portion of the sale to the account of the coffee shop. This account of the coffee shop may be related to the business subscription that the coffee shop has with the media service, or may be a separate rewards-style account associated with the coffee shop.

In another example, the user connects the computing device to a local communication region at a coffee shop. The user views the selected services available at the coffee shop (e.g., "The Roasted Bean"). The user selects to download promotional content available on the local communication region at the coffee shop. The content and associated metadata are copied to the user's computing device (e.g., to an inbox) along with an identifier associated with the coffee shop (e.g., "The Roasted Bean"). The user may only consume the downloaded promotional media content for a time period defined by the digital rights management policy associated with the downloaded promotional media content. After the time period expires, the copies of the downloaded promotional media content stored on the computing device are deleted from the computing device or otherwise rendered not playable. The metadata, however, remains on the computing device to enable the user to subsequently purchase the media content.

The user leaves the coffee shop, thereby disconnecting from the local communication region. Outside the local communication region (e.g., on a bus), the user browses the inbox on the computing device and opens the entry associated with "The Roasted Bean". The downloaded promotional media content is listed therein. The user selects a particular media content item and begins playback of the item.

At home, the user connects the computing device to a personal computer that initiates a synchronization of the metadata (but not the media content items) from the computing device to the personal computer. After synchronization completes, the user opens a journal (e.g., see FIG. 9) on the personal computer and navigates to the entry for the coffee shop. All the media content that was copied to the computing device while at the coffee shop is listed with the option to purchase the downloaded media content. The user selects a few of the media content items and purchases them. The purchase request, along with the identifier of the coffee shop, is sent to the media service. The media service identifies that "The Roasted Bean" coffee shop recommended the media content items to the user, and credits a portion of the sale to the account of the coffee shop. As with the previous example, this account of the coffee shop may be related to the business subscription that the coffee shop has with the media service, or may be a separate rewards-style account associated with the coffee shop.

In yet another example, George and David are both near the same WiFi hotspot in a coffee shop. David is using a portable media player that has a manual mode and an automatic mode. In manual mode, David is alerted that his portable media player has detected George, and David is prompted to indicate whether he would like to receive digital content available for distribution by George. For example, a reference to George (such as an avatar or screen name or the like) appears on David's user interface, and David selects George via the user interface. David's selection of George via the user interface results in media content items and associated metadata being transmitted from George's portable media player to David's portable media player.

In automatic mode, David is not alerted that his portable media player has detected George. Digital media content items available for distribution by George are automatically transmitted, pushed, or otherwise sent from George's computing device to David's media player. The available digital media content items on George's computing device are identified for transmission by evaluating digital content distribution criteria associated with David's portable media player and/or George's computing device. For example, David's portable media player automatically transmits the digital content distribution criteria to George's computing device such that George's computing device identifies the media content items suitable for transmission to David's portable media player. Alternatively or in addition, George's computing device identifies the media content items for transmission to David's portable media player based on digital content distribution criteria associated with George's computing device.

The automatic and manual modes described in the above example correspond to consent models. Users may give explicit consent to receive any and all media content items from any user within the proximity, or may limit such consent by evaluating conditions to determine if consent is granted in particular situations.

The figures, description, and examples herein as well as elements not specifically described herein but within the scope of aspects of the invention constitute means for sharing the media content items stored in the memory area among the plurality of users, and means for updating the subscription information stored in the user profiles.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The word "exemplary" is intended to mean serving as an example, instance, illustration, or the like. Any implementation or aspect thereof described herein as "exemplary" is not necessarily to be constructed as preferred or advantageous over other implementations or aspects thereof.

It will further be understood that when one element is indicated as being responsive to another element, the elements may be directly or indirectly coupled.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
    a memory area associated with a media service, said memory area comprising a computer storage medium, said memory area storing user profiles for a plurality of users and storing media content items each having a digital rights management policy associated therewith, said user profiles including subscription information; and
    a processor remote from the memory area, said processor configured to execute computer-executable instructions for:
    detecting a computing device of a particular user within a local communication region, said local communication region comprising a media service access zone, said media service access zone comprising a retail location, said computing device being associated with the particular user;
    establishing a wireless connection to the detected computing device of the particular user;
    enabling the media service to authenticate the particular user based on the user profiles stored in the memory area;
    enabling access by the computing device of the particular user, based on the authentication by the media service, to the user profiles stored in the memory area for the particular user to update the subscription information stored in one of the user profiles associated with the particular user, said subscription information including subscription licenses to the media service; and
    sending, to a computer storage medium associated with the computing device of the particular user, one or more of the media content items stored in the memory area and the digital rights management policy associated therewith in accordance with the associated digital rights management policy, said associated digital rights management policy indicating whether the particular user has a right to distribute from the computing device of the particular user the one or more provided media content items to one or more other computing devices within the local communication region.

2. The system of claim 1, wherein the user profiles comprise a plurality of playlists.

3. The system of claim 2, wherein the processor is further configured to execute computer-executable instructions for updating the plurality of playlists upon connection to the detected computing device of the particular user.

4. The system of claim 1, wherein the processor is configured to establish the wireless connection to the computing device of the particular user without input from the user.

5. The system of claim 1, wherein the computer-executable instructions further include instructions for enabling, based on the authentication by the media service, access by the computing device of the particular user to one or more third-party resources.

6. The system of claim 5, wherein the one or more third-party resources include one or more of the following: printing to a printer in the local communication region, accessing the Internet, and transmitting media content items to a display device in the local communication region.

7. The system of claim 1, wherein the authentication by the media service is based upon payment by the particular user to access the media service.

8. The system of claim 1, wherein the computer-executable instructions further include instructions for providing, to the computing device of the particular user after establishing the wireless connection to the computing device of the particular user, a user interface indicating that the media service is available.

9. The system of claim 1, wherein the media content items include one or more of the following content: audio, video, still images, full- or partial-length songs and movies, video clips or shorts, recorded television, and product commercials.

10. The system of claim 1, wherein the wireless connection comprises a wireless universal serial bus (USB) connection.

11. The system of claim 1, wherein the wireless connection comprises a Bluetooth connection.

12. The system of claim 1, wherein the user profile for the particular user contains subscription information associated therewith for authentication by the media service.

13. The system of claim 1, wherein the digital right management policy associated with a media content item includes an expiration date for the media content item, such that the associated media content item is deleted or otherwise not renderable after said expiration date.

14. The system of claim 1, wherein the local communication region comprises a local media server connected to one or more wireless access points via a data communication network.

* * * * *